United States Patent
Warner

(10) Patent No.: US 9,010,565 B2
(45) Date of Patent: Apr. 21, 2015

(54) COLLAPSIBLE BOWL

(75) Inventor: Jerry Allen Warner, Brunswick, OH (US)

(73) Assignee: Jerry A. Warner, Brunswick, OH (US)

( * ) Notice: Subject to any disclaimer, the term of this patent is extended or adjusted under 35 U.S.C. 154(b) by 1969 days.

(21) Appl. No.: 12/060,930

(22) Filed: Apr. 2, 2008

(65) Prior Publication Data

US 2009/0250009 A1    Oct. 8, 2009

(51) Int. Cl.
- *F25D 5/02* (2006.01)
- *F25D 3/08* (2006.01)
- *A01K 7/00* (2006.01)
- *A01K 7/02* (2006.01)
- *B65D 5/40* (2006.01)
- *B65D 81/38* (2006.01)

(52) U.S. Cl.
CPC .. *A01K 7/00* (2013.01); *Y10T 29/53* (2015.01); *A01K 7/025* (2013.01); *A01K 7/027* (2013.01); *B65D 5/40* (2013.01)

(58) Field of Classification Search
USPC ............ 220/592.03, 592.1, 592.25, 6, 62.13, 220/666, 554; 206/546, 545, 541; 62/457.2, 62/457.7
See application file for complete search history.

(56) References Cited

U.S. PATENT DOCUMENTS

| | | | | |
|---|---|---|---|---|
| 5,265,960 A | | 11/1993 | Shikler | |
| 5,490,396 A | * | 2/1996 | Morris | 62/457.2 |
| 5,562,228 A | * | 10/1996 | Ericson | 62/457.2 |
| 5,570,588 A | * | 11/1996 | Lowe | 62/457.7 |
| 5,797,529 A | * | 8/1998 | Lavine | 224/575 |
| 6,019,244 A | * | 2/2000 | Jones | 220/666 |
| 6,067,803 A | | 5/2000 | Wolsey et al. | |
| 6,332,712 B1 | | 12/2001 | Headley | |
| 6,422,032 B1 | | 7/2002 | Greene | |
| 6,719,140 B1 | | 4/2004 | Rinsler | |
| 7,040,115 B1 | * | 5/2006 | Lopez et al. | 62/457.2 |
| 7,475,564 B2 | * | 1/2009 | Kagen | 62/457.2 |
| 2002/0066413 A1 | * | 6/2002 | Prezant | 119/61 |
| 2003/0136702 A1 | * | 7/2003 | Redzisz et al. | 206/545 |
| 2004/0167044 A1 | * | 8/2004 | Ruhr et al. | 508/506 |
| 2005/0183446 A1 | * | 8/2005 | Fuchs | 62/457.7 |
| 2005/0284718 A1 | * | 12/2005 | Tai | 190/107 |
| 2006/0027178 A1 | * | 2/2006 | Stephens | 119/61.56 |
| 2006/0191929 A1 | * | 8/2006 | Berg et al. | 220/6 |
| 2006/0193541 A1 | * | 8/2006 | Norcom | 383/200 |
| 2007/0012593 A1 | * | 1/2007 | Kitchens et al. | 206/545 |
| 2007/0163507 A1 | * | 7/2007 | Lynch | 119/61.56 |
| 2008/0164265 A1 | * | 7/2008 | Conforti | 220/592.2 |
| 2008/0307824 A1 | * | 12/2008 | Botich | 62/457.2 |

* cited by examiner

*Primary Examiner* — Mickey Yu
*Assistant Examiner* — Niki Eloshway
(74) *Attorney, Agent, or Firm* — Ralph E. Jocke; Walker & Jocke Co., LPA

(57) ABSTRACT

A collapsible bowl described herein includes a base, wherein the base includes a top, a bottom, a chamber that is between the top and the bottom, a first edge, and a seam, wherein the base is foldable along the seam. The collapsible bowl also includes a first side that includes a top edge and a bottom edge, wherein the bottom edge of the first side is coupled to the first edge of the base, wherein the chamber is configured to receive a foldable cooling apparatus that is adapted to modify a temperature of a liquid in the collapsible bowl.

20 Claims, 6 Drawing Sheets

COLLAPSIBLE BOWL

TECHNICAL FIELD

Aspects described herein relate to collapsible liquid dishes. More specifically, aspects described herein relate to a collapsible liquid storage dish that keeps liquids relatively cool and permits pets, such as dogs, to drink liquids from the dish.

BACKGROUND

Different kinds of dishes are used to store liquids and drinking water. Some dishes are solid and fixed in shape and are not easily transported or packed for transport. Many dishes are made out of materials that are heavy and awkward to carry for any significant distance.

Hikers and campers in dry country typically carry drinking water in bottles or canteens. Many hikers and campers have pets, and desire that their pets accompany them on hikes or camping trips. Pets, however, may find obtaining water from a bottle or canteen difficult. Furthermore, carrying a conventional liquid bowl for a pet on a hike is oftentimes impractical, as such bowls require a significant amount of space.

SUMMARY

The following is a brief summary of subject matter that is described in greater detail herein. This summary is not intended to be limiting as to the scope of the claims.

A collapsible bowl described in greater detail below includes a base, wherein the base includes a top, a bottom, a chamber that is between the top and the bottom, a first edge, and a seam. The base of the collapsible bowl is foldable along the seam. The collapsible bowl additionally includes a first side that includes a top edge and a bottom edge, wherein the bottom edge of the first side is coupled to the first edge of the base. Furthermore, the chamber can be configured to receive a foldable gel pack that is adapted to control a temperature of a liquid in the collapsible bowl.

In another example, a collapsible bowl is described herein, wherein the collapsible bowl can include a base, wherein the base includes a chamber, a first seam, and an aperture. The chamber can be configured to receive and retain a cooling apparatus (such as a gel pack). The base may be foldable along the first seam, and the aforementioned aperture may be configured to facilitate deposit of the cooling apparatus into the chamber. A surface area of the base may be defined by a first edge, a second edge, a third edge, and a fourth edge.

The collapsible bowl may further include a zipper that facilitates opening and closing of the aperture on the base. The collapsible bowl may also include four sides, where each of the sides includes a top and a bottom. The bottoms of the first side, the second side, the third side, and the fourth side may be coupled to the first edge, the second edge, the third edge, and the fourth edge of the base. Furthermore, the first side may be substantially parallel with the third side and substantially perpendicular with the second side and the fourth side.

In addition, a method is described herein, wherein the method includes acts of producing a foldable base for a collapsible bowl, wherein the foldable base includes a seam and a chamber, wherein the foldable base is foldable along the seam and the chamber is configured to retain a foldable cooling apparatus therein. The method may also include attaching a plurality of sides to the foldable base, wherein the plurality of sides facilitate retention of liquid in the collapsible bowl.

Other aspects will be appreciated upon reading and understanding the attached figures and description.

DETAILED DESCRIPTION

Figure 1:
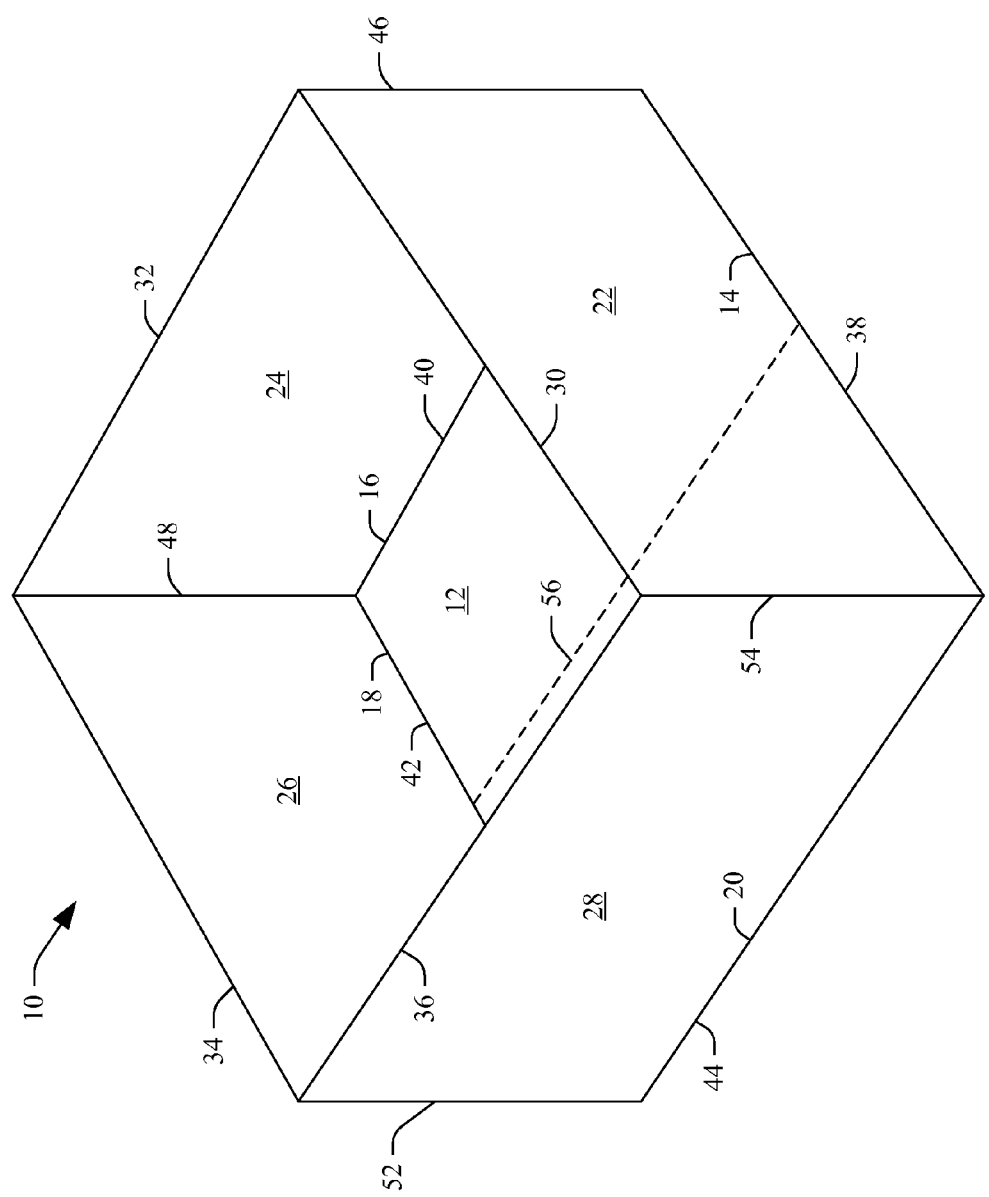
FIG. 1 is an example illustration of a collapsible bowl in an unfolded configuration.

Referring now to the drawings and particularly to FIG. 1, there is shown a diagram of an example collapsible bowl 10. The collapsible bowl 10 includes a base 12, wherein the base 12 has a first edge 14, a second edge 16, a third edge 18, and a fourth edge 20 that define the boundaries/surface area of the base 12. In the example collapsible bowl 10, the edges 14-20 define the base 12 such that the base 12 is approximately square in nature. Pursuant to an example, the edges 14-20 may each be approximately six inches in length. It is to be understood, however, that the base 12 may be circular or ovular in nature, may be rectangular in nature or may be some other polygon, such that the base 12 may have more or fewer edges than what is shown.

The example collapsible bowl 10 additionally includes a first side 22, a second side 24, a third side 26, and a fourth side 28. The sides 22-28 each have a top edge 30, 32, 34, and 36 and a bottom edge 38, 40, 42, and 44, respectively. The bottom edges 38-44 of the sides 22-28 may be coupled to the edges 14-20 of the base 12. As shown, when the collapsible bowl 10 is in an unfolded configuration, the sides 22-28 may be approximately perpendicular to the base 12 of the collapsible bowl. In an example, a distance between the top edges 30-36 and the bottom edges 36-44 may be approximately four inches, and a length of the top edges 30-36 and the bottom edges 38-44 may be approximately six inches. Furthermore, the first side 22 and the third side 26 may be substantially parallel with one another, and the second side 24 and the fourth side 28 may be substantially parallel with one another. The first side 22 may be substantially perpendicular to the second side 24 and the fourth side 28, and the third side 26 may be substantially perpendicular to the second side 24 and the fourth side 28. A first side edge 46 may define an intersection between the first side 22 and the second side 24, a second side edge 48 may define an intersection between the second side 24 and the third side 26, a third side edge 50 may define an intersection between the third side 26 and the fourth side 28, and a fourth side edge 52 may define an intersection between the fourth side 28 and the first side 22.

Furthermore, the base 12 can include a seam 56, wherein the base 12 may be foldable along the seam 56. For instance, the seam 56 may be substantially parallel to the second side 24 and the fourth side 28, and may be substantially perpendicular to the first side 22 and the third side 26. Moreover, the seam 56 may be positioned approximately equidistant from the second side 24 and the fourth side 28. As will be described in greater detail below, the base 12 may be folded along the seam 56 such that the seam 56 is translated towards and approximately parallel to the top edges 32 and 36 of the second side 24 and the fourth side 28, respectively. The seam 56 may be a hinged seam, a stitched seam, a seam created by folding, or any other suitable seam.

In an unfolded configuration, the collapsible bowl 10 may be configured to receive and retain liquid, for instance, that may be consumed by a pet, such as a dog or cat. Accordingly, waterproof, flexible material may be used manufacture the collapsible bowl 10. Pursuant to an example, the material may be polyester. In another example, the collapsible bowl 10 may be lined by a first material and backed by a second material. For instance, the first material may be 1 90T polyester that includes a PVC backing, and the second material may be 210D polyester with a PVC backing. In addition, the base 12 and the sides 22-28 may include insulating material to facilitate controlling temperature of liquids placed inside the collapsible bowl 10. Pursuant to an example, the insulating material may be made of fiberglass or may be some other suitable material.

Further, while not illustrated, the collapsible bowl 10 in an unfolded position may include numerous compartments. For instance, the collapsible bowl 10 may include a first compartment for retaining liquid and a second compartment for retaining food for a pet. For instance, the collapsible bowl 10 may include a waterproof divider (not shown) that allows liquid to be retained in one compartment of the collapsible bowl 10 without such liquid entering into the other compartment (which is used to retain food).

Figure 2:
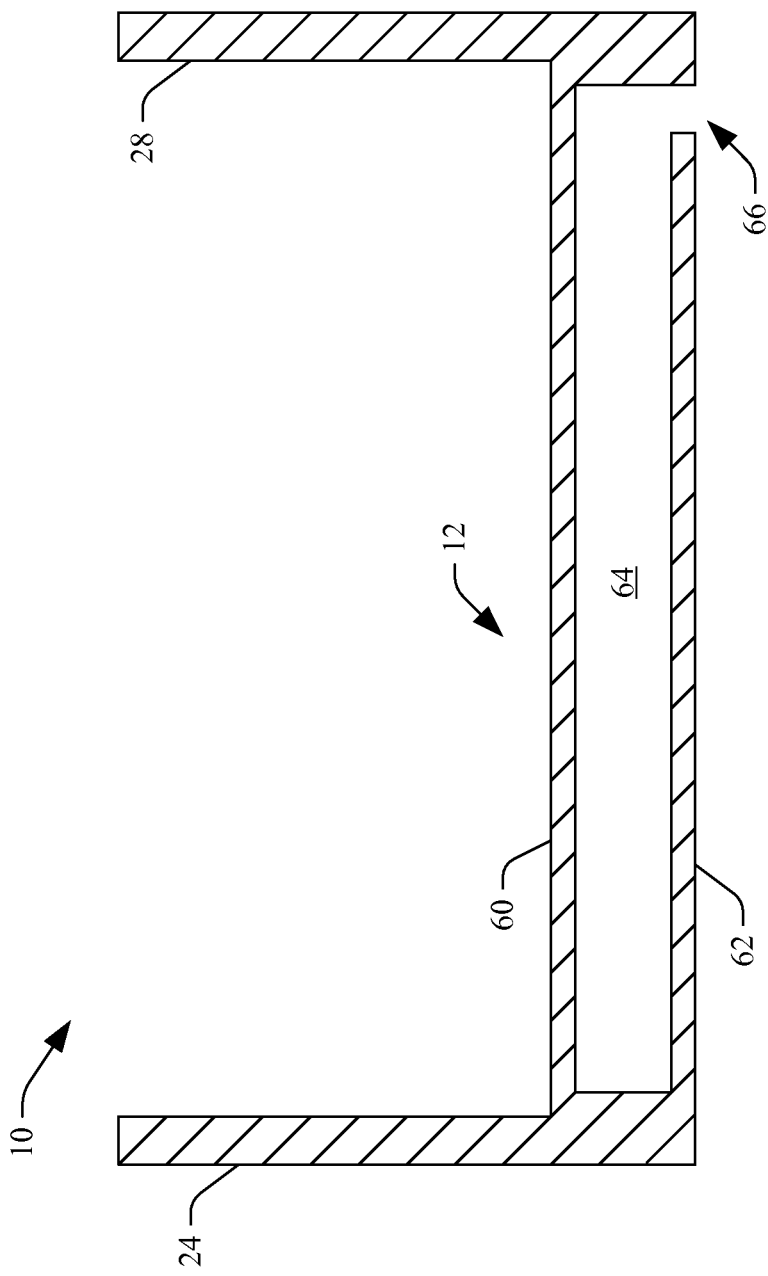
FIG. 2 is a cross-sectional view of an example collapsible bowl in an unfolded configuration.

With reference now to FIG. 2, an example cross-sectional view of the collapsible bowl 10 is illustrated. In this view, the collapsible bowl 10 is in an unfolded configuration, such that the second side 24 and the fourth side 28 are substantially perpendicular to the base 12. The base 12 includes a top 60 and a bottom 62, as well as a chamber 64 that is between the top 60 and the bottom 62. While shown as being included in the base 12 of the collapsible bowl 10, it is to be understood that the chamber 64 or a different chamber may be included in one or more sides of the collapsible bowl.

The chamber 64 is configured to receive a foldable cooling apparatus, such as a gel pack (e.g., foldable in a manner that is consistent with the seam 56 shown in FIG. 1) that is adapted to control a temperature of a liquid in the collapsible bowl 10. In an example, the base 12 of the collapsible bowl 10 includes an aperture 66 that is adapted to receive the cooling apparatus (not shown) such that the cooling apparatus can be deposited in the chamber 64. The chamber 64 can be of a size that is sufficient to retain a cooling apparatus that may be used to maintain or alter a temperature of a liquid that is retained in the collapsible bowl 10. In addition, the aperture 66 may be of a suitable size to facilitate receipt of the cooling apparatus into the chamber 64. Therefore, for instance, the aperture 66 may be between four and six inches in length.

In addition, while not shown, the aperture 66 may be closed by a suitable closing mechanism, thereby facilitating securing the cooling apparatus in the chamber 64. For instance, a zipper can be used in connection with closing the aperture 66 when the cooling apparatus is deposited in the chamber 66. In another example, Velcro may be used in connection with closing the aperture 66 when the cooling apparatus is deposited in the chamber 66. In still yet another example, snaps may be used in connection with closing the aperture 66 when the cooling apparatus is deposited in the chamber 66. Other mechanisms for closing the aperture 66 are also contemplated and intended to fall under the scope of the hereto-appended claims.

Pursuant to an example, when the chamber 64 includes a cooling apparatus, temperature of a liquid can be dropped to a relatively cool temperature or maintained at a relatively cool temperature. For instance, if the ambient temperature is 85 degrees Fahrenheit, when liquid is placed in the collapsible bowl 10 (when it includes the cooling apparatus), the temperature of a liquid therein may be dropped from 85 degrees to 70 degrees Fahrenheit in a relatively short period of time (e.g., ten to fifteen minutes). In another example, if the ambient temperature is 80 degrees Fahrenheit, when liquid is placed in the collapsible bowl 10 (when it includes the cooling apparatus), the temperature of a liquid therein may be dropped from 80 degrees to 65 degrees Fahrenheit in a relatively short period of time (e.g., ten to fifteen minutes).

Figure 3:
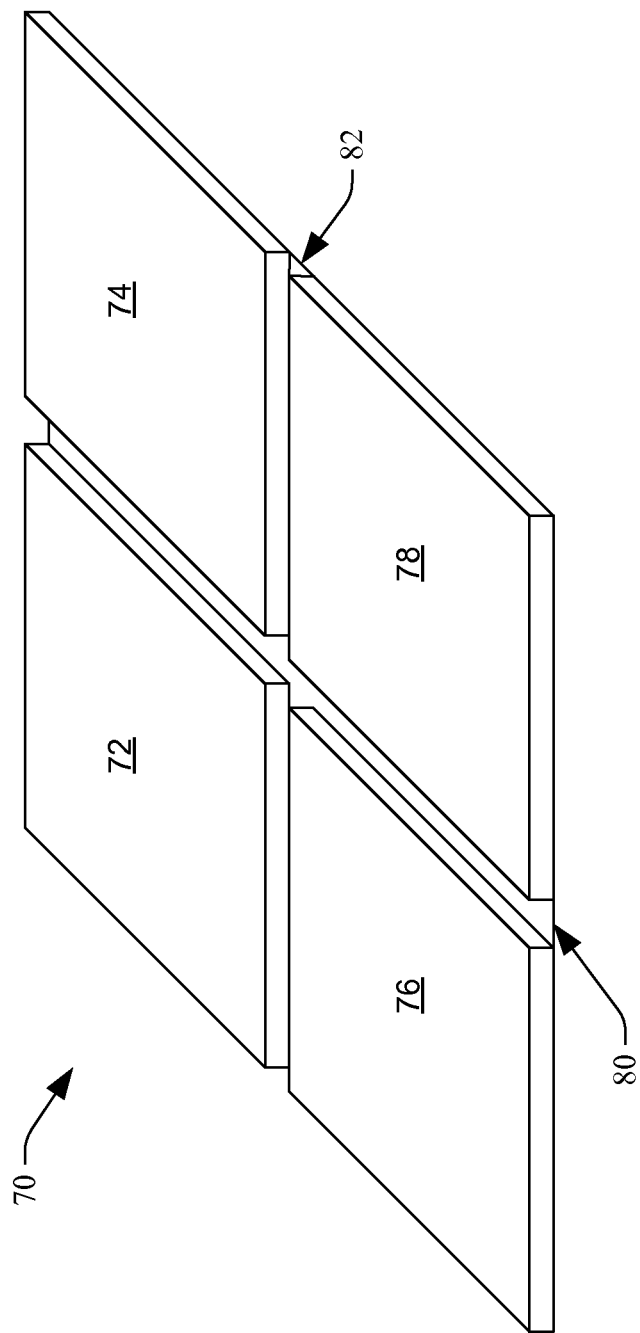
FIG. 3 is an example cooling apparatus, such as a gel pack, that can be placed in a chamber of a collapsible bowl.

Referring now to FIG. 3, an example cooling apparatus 70 that may be used in connection with the collapsible bowl 10 is illustrated. The cooling apparatus 70 may be a gel pack, for example, and may include cooling material that can be 99.9% water and approximately 0.1% Dowicil. In another example, the cooling material may be 100% water. In yet another example, the cooling material may be or include dry ice, Freon, or other suitable cooling material.

The cooling apparatus 70 is illustrated as including four separate portions 72, 74, 76, and 78, wherein cooling material may be included in each of the portions 72-78. In an example, the portions 72-78 may be substantially equivalent in size, and may be approximately square in shape. For instance, each of the portions 72-78 may be approximately three inches by three inches. The portions 72-78 are separated by two seams 80 and 82, wherein the cooling apparatus may be folded along either of the two seams 80 and 82. Thus, when the cooling apparatus 70 is deposited in the chamber 64 of the base 12 of the collapsible bowl 10 (FIG. 2), the base 12 can be folded along the seam 56 (FIG. 1), as the cooling apparatus 70 can be folded along either of the seams 80 or 82.

While the cooling apparatus 70 is shown as including two seams, it is understood that the cooling apparatus 70 may include more or fewer seams, so long as one seam of the cooling apparatus 70 aligns with the seam 56 of the base 12 when the cooling apparatus 70 is deposited in the chamber 64.

Figure 4:
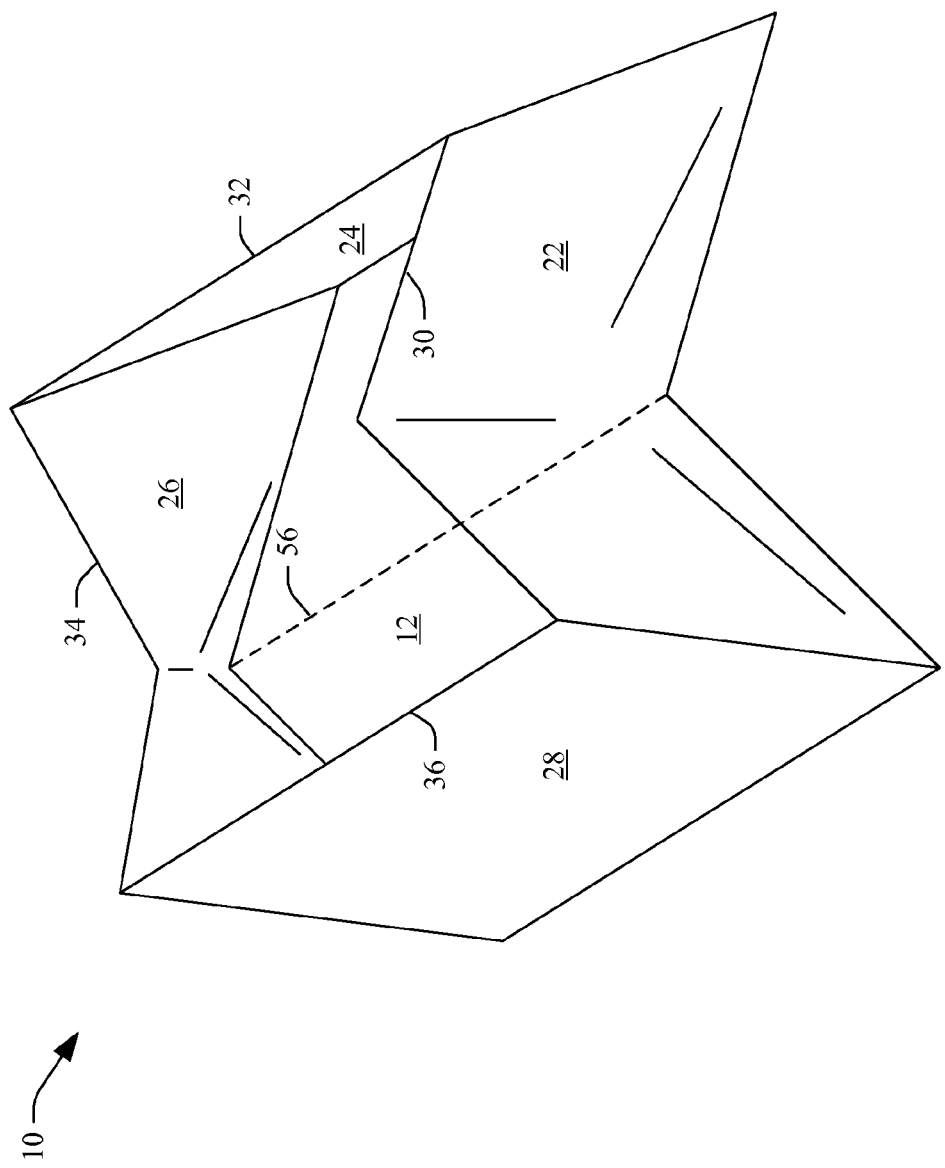
FIG. 4 is an example illustration of a collapsible bowl in a partially collapsed configuration.

Turning now to FIG. 4, the collapsible bowl 10 is shown as a collapsing process is begun to render the collapsible bowl 10 easily portable. More particularly, the seam 56 on the base 12 of the collapsible bowl 10 is moved in a direction towards the top edges 30-36 of the sides 22-28. In addition, the seam 56 remains substantially parallel with the top edges 32 and 36 of the second side 24 and the fourth side 28, respectively. At least the first side 22 and the third side 26 may be made out of flexible material, which allows such sides 22 and 26 to bend as the seam 56 is moved upwards. In another example, the sides 22 and 26 may be made out of a solid material, but may include seams (not shown) that allow the sides 22 and 26 to be foldable. It can be ascertained that the sides 24 and 28 remain planar in nature.

As noted above, the base 12 includes a chamber 64 (FIG. 2), and a cooling apparatus may be retained in the chamber 64 while the collapsible bowl 10 is being folded/collapsed. For instance, the cooling apparatus may include a seam that corresponds to the foldable seam 56 of the base.

Figure 5:
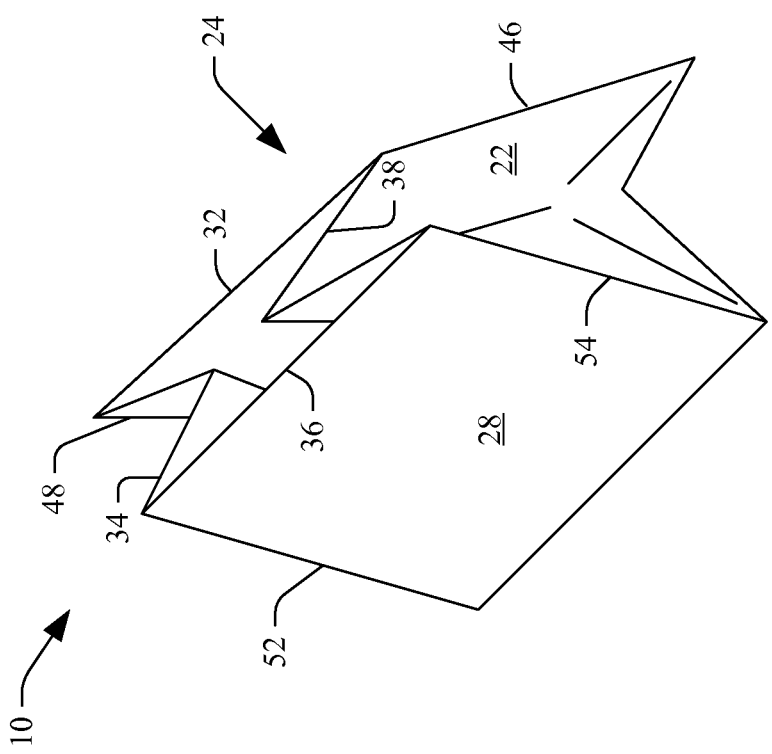
FIG. 5 is an example illustration of a collapsible bowl in a partially collapsed configuration.

Now referring to FIG. 5, another depiction of the collapsible bowl 10 during a collapsing process is illustrated. As shown, the seam 56 of the base 12 is pushed further towards the top edges 30-36 of the sides 22-28. Moreover, the top edges 32 and 36 of the second side 24 and the fourth side 28 are moved closer together when compared with the configuration shown in FIG. 4.

Figure 6:
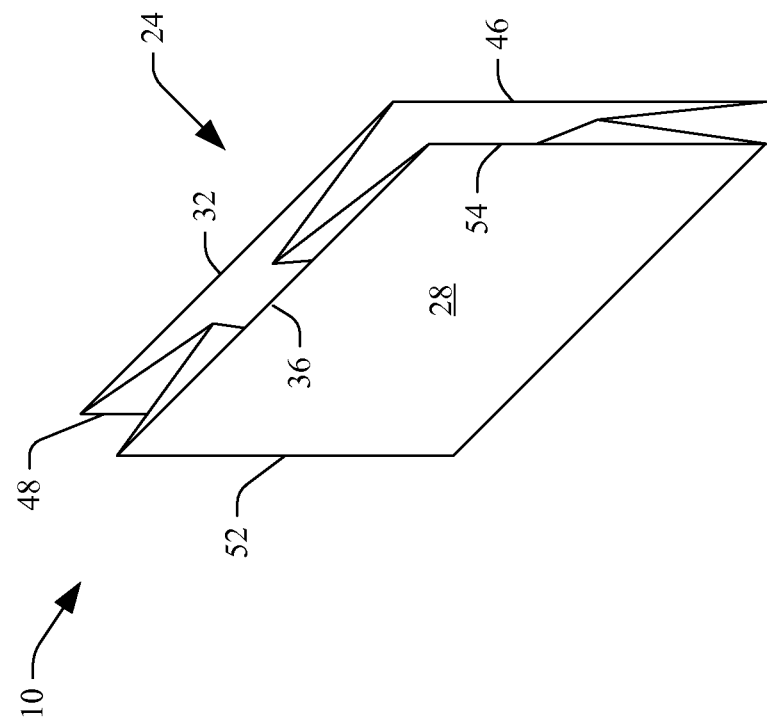
FIG. 6 is an example illustration of a collapsible bowl in a wholly collapsed configuration.

With reference to FIG. 6, a depiction of the collapsible bowl 10 in a wholly collapsed configuration is illustrated. The second side 24 and the fourth side 28 are substantially parallel with one another, and the top edges 32 and 36 are nearly coupled. The base 12 is folded along the seam 56 (FIGS. 1 and 4), such that halves of the base 12 are substantially parallel with one another and are substantially parallel with the second side 24 and the fourth side 28.

Once in the configuration depicted in FIG. 6, various mechanisms may be used to facilitate maintaining the collapsible bowl 10 in the wholly collapsed configuration. For instance, mechanisms such as snaps or Velcro strips may be used to maintain the collapsible bowl 10 in the wholly collapsed configuration. In another example, a zipper or zippers may be used to maintain the collapsible bowl 10 in the wholly collapsible configuration. For instance, a zipper may be placed at least along the top edges 32 and 36, such that when the zipper is closed the top edges 32 and 36 are coupled. In another example, a zipper may be placed at least along the bottom edges 40 and 44 of the second side 24 and the fourth side 28, such that when the zipper is closed the bottom edges 40 and 44 are coupled.

In still yet another example, a zipper may be used to couple at least the first side edge 46 and the fourth side edge 52. In yet another example, a zipper may be used to couple at least the second side edge 48 and the third side edge 50. In still yet another example, a zipper may be used to couple at least the first side edge 46 and the fourth side edge 52, may be further used to couple the top edge 32 and the top edge 36, and may further be used to couple the second side edge 48 and the third side edge 50. Of course, other example uses of zippers, snaps, and Velcro to maintain the wholly collapsed configuration of the collapsible bowl 10 are contemplated and are intended to fall under the scope of the hereto-appended claims. In addition, while not shown, it is to be understood that the collapsible bowl 10 may have a coupling mechanism attached thereto that facilitates attaching the collapsible bowl 10 to a belt loop, a backpack, a key ring, a hiking boot, or the like. Such coupling mechanism may be a clip that, for instance, may be clipped to a belt loop of a hiker. In another example, the coupling mechanism may be a Velcro strap.

Still further, while not shown, a carrying case may be used to render the collapsible bowl 10 easily portable when in the wholly collapsed configuration. The carrying case may be made of a lightweight polyester material, and may include a drawstring that can be used to secure the collapsible bowl in the carrying case.

Moreover, while FIGS. 4-6 illustrate on example manner for collapsing the collapsible bowl 10, it is understood that other manners for collapsing the collapsible bowl 10 are contemplated. For instance, the base 12 may remain planar, and the each side except the fourth side 28 may be foldable. Of course, other manners for collapsing the collapsible bowl are contemplated and are intended to fall under the scope of the hereto-appended claims.

Figure 7:
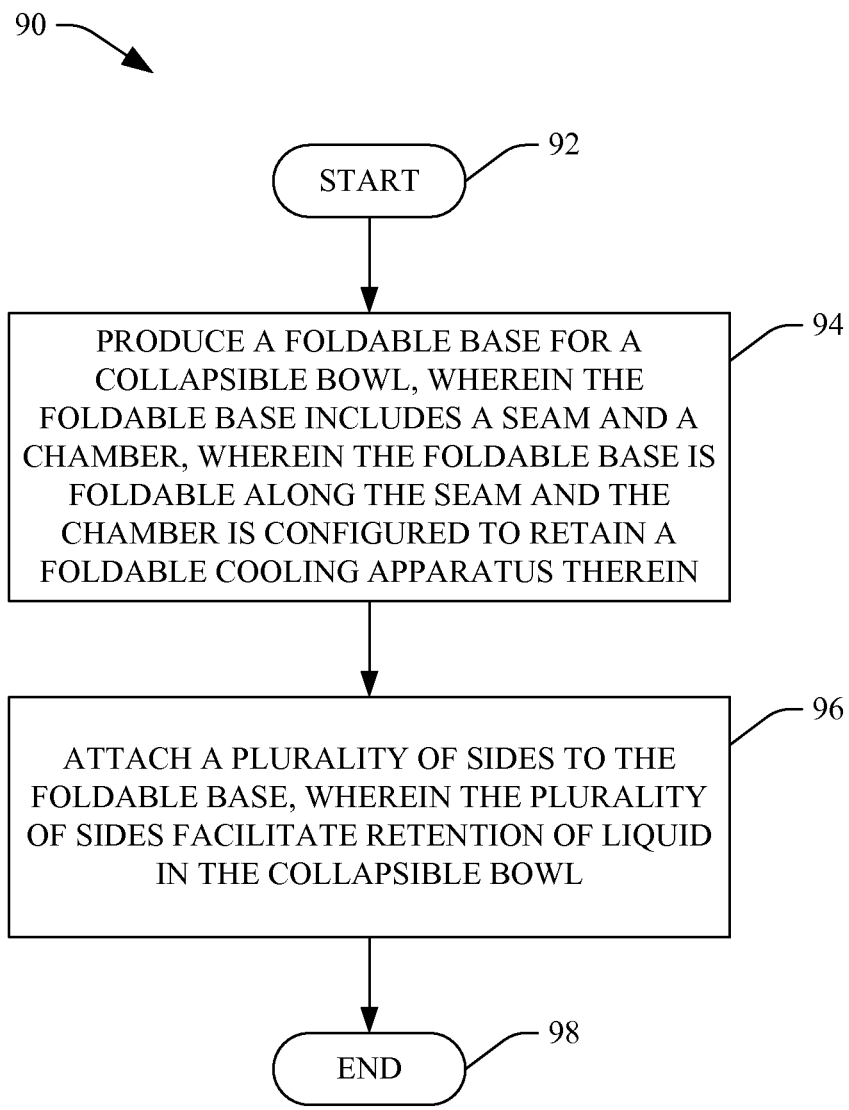
FIG. 7 is an example methodology for manufacturing a collapsible bowl.

With reference now to FIG. 7, an example methodology 90 that facilitates production of a collapsible bowl is illustrated. While the methodology 90 is illustrated as including a series of acts that occur in a particular sequence, it is to be understood that the described acts may occur in a different sequence than what is illustrated.

The methodology 90 begins at 92, and at 94 a foldable base is produced for a collapsible bowl. The foldable base may include a seam and a chamber, wherein the foldable base is foldable along the seam and the chamber is configured to retain a foldable cooling apparatus therein. As described above, the cooling apparatus may include a foldable seam, wherein the foldable seam of the cooling apparatus corresponds to the seam on the foldable base. At 96, a plurality of sides are attached to the foldable base, wherein the plurality of sides facilitate retention of liquid in the collapsible bowl. The methodology 90 completes at 98.

As used herein, the term "approximately" may mean within a certain percentage, such as 5%, of a specified value. In another example, the term "approximately" may mean within 10% of a specified value.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the examples are not limited to the exact details shown and described.

In the specification example manners/mechanisms and materials may have been recited, however, any manner/mechanism or material is intended to fall under the scope of the hereto appended claims.

Having described the features, discoveries and principles of the examples, the manner in which it is constructed and operated, and the advantages and useful results attained; the new and useful structures, devices, elements, arrangements, parts, combinations, systems, equipment, operations, methods and relationships are set forth in the appended claims.

What is claimed is:

1. A collapsible bowl comprising:
   a base, wherein the base includes a top, a bottom, a chamber that is between the top and the bottom, a first edge, and a seam, wherein the base is foldable along the seam, wherein the base includes a second edge, a third edge, and a fourth edge, wherein the first edge, second edge, third edge, and fourth edge define a perimeter of the base, and wherein the first edge, second edge, third edge, and fourth edge have a substantially similar length, and wherein the base includes an aperture that facilitates deposit of the cooling apparatus into the chamber; and
   a first side that includes a top edge and a bottom edge, wherein the bottom edge of the first side is coupled to the first edge of the base, wherein the chamber is configured to receive a foldable cooling apparatus that is adapted to modify a temperature of a liquid in the collapsible bowl, and wherein the collapsible bowl is free of a lid such that the liquid in the collapsible bowl is accessible to a pet when the collapsible bowl is in an unfolded configuration.

2. The collapsible bowl according to claim 1, further comprising a second side, a third side, and a fourth side, wherein each of the first side, the second side, the third side, and the fourth side include a top and a bottom, wherein the base further includes a second edge, a third edge, and a fourth edge, wherein the bottom of the second side is coupled to the second edge of the base, the bottom of the third side is coupled to the third edge of the base, and the bottom of the fourth side is coupled to the fourth edge of the base, wherein the first side, the second side, the third side, and the fourth side are substantially perpendicular to the base when the collapsible bowl is in an unfolded configuration, wherein the first side is substantially parallel to the third side and substantially perpendicular to the second side and the fourth side, and wherein the base and at least the first side include insulating material.

3. The collapsible bowl according to claim 2, further comprising a zipper that acts to couple the top of the first side with the top of the third side.

4. The collapsible bowl according to claim 3, wherein the first edge of the base, the second edge of the base, the third edge of the base, and the fourth edge of the base substantially equivalent in length.

5. The collapsible bowl according to claim 4, wherein a waterproof material is used to manufacture the collapsible bowl.

6. The collapsible bowl according to claim 2, further comprising:
a first side edge, a second side edge, a third side edge, and a fourth side edge, wherein the first side edge defines an intersection between the first side and the second side, the second side edge defines an intersection between the second side and the third side, the third side edge defines an intersection between the third side and the fourth side, and the fourth side edge defines an intersection between the fourth side and the first side; and
a zipper that facilitates coupling the first side edge and the second side edge, the top of the first side and the top of the third side, and the third side edge and the fourth side edge when the collapsible bowl is in a wholly collapsed configuration.

7. The collapsible bowl according to claim 1, wherein the cooling material is a gel pack.

8. The collapsible bowl according to claim 7, wherein the gel pack includes a solution comprising of about 99.9% water and about 0.1% Dowicil.

9. The collapsible bowl according to claim 1, wherein the base and the first side include a polyester material.

10. The collapsible bowl according to claim 9, wherein the polyester material is 210D polyester with PVC backing and an interior of the collapsible bowl is lined with 190T polyester with PVC backing 11. The collapsible bowl according to claim 1, further comprising a coupling mechanism that facilitates coupling the collapsible bowl to a user.

12. The collapsible bowl of claim 1, wherein the collapsible bowl is free of a lid such that a pet is able to retrieve water from the collapsible bowl when the collapsible bowl is in an unfolded configuration.

13. A collapsible bowl comprising:
a base, wherein the base of the collapsible bowl includes a chamber, a first seam, and an aperture, wherein the chamber is configured to receive and retain a cooling apparatus, wherein the base is foldable along the first seam, wherein the aperture is configured to facilitate deposit of the cooling apparatus into the chamber, wherein a surface area of the base is defined by a first edge, a second edge, a third edge, and a fourth edge;
a zipper that facilitates opening and closing of the aperture on the base;
a first side that includes a top and a bottom;
a second side that includes a top and a bottom;
a third side that includes a top and a bottom; and
a fourth side that includes a top and a bottom, wherein the bottoms of the first side, the second side, the third side, and the fourth side are coupled to the first edge, the second edge, the third edge, and the fourth edge of the base, respectively, and wherein the first side is substantially parallel with the third side and substantially perpendicular with the second side and the fourth side when the collapsible bowl is in an unfolded configuration, and wherein the collapsible bowl is free of a lid such that the collapsible bowl is configured to receive and retain a liquid when in the unfolded configuration.

14. The collapsible bowl according to claim 13, further comprising the cooling apparatus, wherein the cooling apparatus includes at least two portions that are separated by a second seam, wherein the cooling apparatus is foldable along the second seam, and wherein the first seam of the base and the second seam of the cooling apparatus are in substantial alignment when the cooling apparatus is deposited in the chamber.

15. The collapsible bowl according to claim 13, wherein the cooling apparatus is a gel pack.

16. The collapsible bowl according to claim 13, further comprising a coupling mechanism that facilitates coupling the collapsible bowl to a user.

17. The collapsible bowl according to claim 13, further comprising a zipper that facilitates coupling the top of the first side with the top of the third side when the collapsible bowl is in a wholly collapsed configuration.

18. The collapsible bowl of claim 13, wherein the base is made of a polyester material.

19. A collapsible bowl, comprising:
a cooling apparatus, wherein the cooling apparatus comprises a first compartment and a second compartment that are separated by a foldable seam, wherein the first compartment and the second compartment comprise a freezable material;
a base, wherein the base of the collapsible bowl comprises a top, a bottom, a chamber between the top and the bottom that is configured to retain the cooling apparatus, a first edge, a second edge, a third edge, and a fourth edge, wherein the first edge, the second edge, the third edge, and the fourth edge are of equal length, wherein the first edge is parallel to the third edge, the second edge is parallel to the fourth edge, and the first edge is perpendicular to the second edge, wherein the bottom of the base comprises an aperture that leads to the chamber, wherein the aperture is configured to receive the cooling apparatus for retention in the chamber, wherein the bottom of the base further comprises a mechanism for opening and closing the aperture, wherein the base further comprises a seam between the first side and the third side that is parallel to the first side and the third side and extends to the second side and the fourth side, wherein the base, the second side, and the fourth side are foldable along the seam, and wherein the foldable seam of the cooling apparatus and the seam of the base are in alignment when the cooling apparatus resides in the retainer;
a first side that is coupled to the first edge of the base, wherein the first side is perpendicular to the base when the collapsible bowl is in an unfolded configuration, and wherein the collapsible bowl is free of a lid such that the collapsible bowl is configured to receive, retain, and cool a liquid when in an unfolded configuration.

20. The collapsible bowl of claim 19, wherein the mechanism for opening and closing the aperture is a zipper.

* * * * *